(12) United States Patent
Wagner et al.

(10) Patent No.: US 7,649,936 B2
(45) Date of Patent: Jan. 19, 2010

(54) DEVICE AND METHOD FOR DETERMINING A CORRELATION MAXIMUM

(75) Inventors: Carmen Wagner, Langensendelbach (DE); Holger Stadali, Erlangen (DE)

(73) Assignee: Fraunhofer-Gesellschaft zur Foerderung der Angewandten Forschung E.V., Munich (DE)

(*) Notice: Subject to any disclaimer, the term of this patent is extended or adjusted under 35 U.S.C. 154(b) by 651 days.

(21) Appl. No.: 11/301,374

(22) Filed: Dec. 12, 2005

(65) Prior Publication Data
US 2006/0161611 A1 Jul. 20, 2006

(30) Foreign Application Priority Data
Dec. 13, 2004 (DE) .................. 10 2004 059 946

(51) Int. Cl.
H04B 1/66 (2006.01)
H04B 1/713 (2006.01)

(52) U.S. Cl. .................. 375/240; 375/142

(58) Field of Classification Search .......... 275/240, 275/130, 142, 150, 316, 317, 365; 455/67.3, 455/214
See application file for complete search history.

(56) References Cited

U.S. PATENT DOCUMENTS

| 5,598,429 | A | 1/1997 | Marshall |
| 5,818,868 | A | 10/1998 | Gaudenzi et al. |
| 6,009,334 | A | 12/1999 | Grubeck et al. |
| 6,424,683 | B1 | 7/2002 | Schollhorn |
| 6,748,007 | B1 | 6/2004 | Lattard et al. |
| 2001/0033603 | A1 | 10/2001 | Olaker |
| 2003/0053558 | A1 | 3/2003 | Unger et al. |
| 2003/0128161 | A1 | 7/2003 | Oh et al. |
| 2003/0156672 | A1* | 8/2003 | O'Shea et al. .............. 375/365 |
| 2003/0215035 | A1 | 11/2003 | Amerga et al. |
| 2003/0227895 | A1 | 12/2003 | Strutt et al. |
| 2004/0017197 | A1 | 1/2004 | Chen et al. |
| 2004/0072579 | A1 | 4/2004 | Hottinen |
| 2004/0203871 | A1 | 10/2004 | Geier et al. |

(Continued)

FOREIGN PATENT DOCUMENTS

DE 19802373 C1 1/1998

(Continued)

OTHER PUBLICATIONS

Harris, F. Multirate Signal Processing for Communication Systems. May 14, 2004. Prentice Hall. p. 400-407.

(Continued)

*Primary Examiner*—Khai Tran
(74) *Attorney, Agent, or Firm*—Michael A. Glenn; Glenn Patent Group

(57) ABSTRACT

A device for detecting a correlation maximum value from a sequence of correlation magnitude values includes a means for determining a reference value from correlation magnitude values within an interval of the sequence of correlation magnitude values, the correlation magnitude value to be assessed lying external to interval. A means for determining a threshold value provides the threshold value in dependence on the reference value. A means for comparing the correlation magnitude value to be assessed with the threshold value ascertained for the correlation magnitude value to be assessed is configured to provide, depending on the comparison result, a trigger signal which indicates whether a correlation magnitude value to be assessed is a correlation maximum value.

17 Claims, 13 Drawing Sheets

U.S. PATENT DOCUMENTS

2006/0018413 A1 * 1/2006 Gupta .................. 375/343

FOREIGN PATENT DOCUMENTS

| EP | 0 632 577 | 1/1995 |
|---|---|---|
| EP | 0 654 913 | 5/1995 |
| EP | 0 820 156 A2 | 1/1998 |
| EP | 0 930 704 A2 | 11/1998 |
| EP | 0 933 882 | 8/1999 |
| EP | 1 089 452 | 4/2001 |
| EP | 1089452 | 4/2001 |
| EP | 1 130 793 A1 | 9/2001 |
| WO | WO 03/01699 | 1/2003 |
| WO | WO 2003/090400 A1 | 11/2003 |

OTHER PUBLICATIONS

Fliege, N. Multiraten-signalverarbeitung. 1993. Germany. p. 256-258.

Li, Xinrong, et al.; Super-Resolution TOA Estimation With Diversity for Indoor Geolocation; Jan. 1, 2004; IEEE.

* cited by examiner

| Name | Type | Owner | Date |
|---|---|---|---|
| windowlength_total | Config | wgc | 13 Oct. 03 |
| Description | | | |
| Number of samples used in the averaging plus those not considered in the averaging | | | |
| Interacts with | | Subscribers | |
| windowlength_mean | | | |
| Value | Unit | State/Min | Max | Quant |
| 100 | B_samples_4 | tbc | | |
| Comment | | | | |
| see FIG. 2 | | | | |

FIGURE 8a

| Name | Type | Owner | Date |
|---|---|---|---|
| windowlength_mean | Config | wgc | 13 Oct. 03 |
| Description | | | |
| Number of samples used for averaging | | | |
| Interacts with | | Subscribers | |
| windowlength_mean | | | |
| Value | Unit | State/Min | Max | Quant |
| 85 | B_samples_4 | tbc | | |
| Comment | | | | |
| see FIG. 2 | | | | |

FIGURE 8b

| Name | Type | Owner | Date |
|---|---|---|---|
| peakmean_thresh | Config | wgc | 23 Oct. 03 |
| Description ||||
| Threshold that must be exceeded by the ratio between correlation and mean value of the correlation ||||
| Interacts with || Subscribers ||
| A_nopartcorrs ||||
| Value | Unit | State/Min | Max | Quant |
| 9 | 1 | tbc | | |
| Comment |||||
| Value is dependent on the number of partial correlations |||||

| Value | Unit | State/Min | Max | Quant |
|---|---|---|---|---|
| 9 | 1 | tbc | | |

FIGURE 8c

| Name | Type | Owner | Date |
|---|---|---|---|
| minsamples_bw2peaks | Config | wgc | 13 Oct. 03 |
| Description ||||
| Minimum difference between two detectable peaks ||||
| Interacts with || Subscribers ||
| | | | |

| Value | Unit | State/Min | Max | Quant |
|---|---|---|---|---|
| 1000 | B_samples_4 | tbc | | |

| Comment |
|---|
| Value must be higher than the maximally occuring delay spread |

FIGURE 8d

| Name | Type | Owner | Date |
|---|---|---|---|
| peak2mean | Trans | wgc | 25 Nov. 03 |
| Description | | | |
| Ratio of the correlation value to the correlation floor in the event of a peak being detected (rounded to one digit after decimal point) | | | |
| Interacts with | | Subscribers | |
| FPGA module and hardware module of the A algo, receiver host, ZRE, monitoring | | hfn, fam, dck, frueh, koe | |
| Update rate | Representation | | |
| ca. t_burstperiod | 1 byte, of which bits 1 to 7 integer value and LSB corresponds to the rounded first digit after decimal point | | |
| Comment | | | |
| only for monitoring in the ZRE | | | |

FIGURE 8e

| Name | Type | Owner | Date |
|---|---|---|---|
| t_noprecorrvals | Const | koe | 9 Dec. 03 |
| Description | | | |
| number of correlation values before the expected correlation peak | | | |
| Interacts with | | Subscribers | |
| T algo, fine correlation | | blg, std, hfn | |
| Value | Unit | State/Min | Max | Quant |
| 30 | B_samples_4 | TBC | | |
| Comment | | | |
| t_noprecorrvals=t_nocrrvals/2 | | | |

FIGURE 8f

| Name | Type | Owner | Date |
|---|---|---|---|
| t_SNIRcorrfact | Conf | koe | 27 Oct. 03 |
| Description | | | |
| Length correction factor for the estimated SNIR of the T burst | | | |
| Interacts with | | Subscribers | |
| T algo, fine correlation | | blg, hfn | |
| Value | Unit | State/Min | Max | Quant |
| | - | 1 | 3 | 1/16 |
| Comment | | | |
| Is approximately the same for both transmit bursts of each transmitter, but may be different for different transmitters | | | |

FIGURE 8g

| Name | Type | Owner | Date |
|---|---|---|---|
| t_SNIRthresh | Var | koe | 27.10.03 |
| Description | | | |
| Threshold for estimated SNIR from which a detected peak in a T burst is said to be valid | | | |
| Interacts with | | Subscribers | |
| T algo | | blg, hfn | |
| Value | Unit | State/Min | Max | Quant |
| $10^{-1.2}$ | - | 1/128 | 127 | 1/128 |
| Comment | | | |
| - in a linear measure, i.e. $10^{1.2}$ corresponds to SNIR = −12dB<br>- may be different for each transmitter (but always the same value for the two T bursts of a transmitter) | | | |

FIGURE 8h

| Name | Type | Owner | Date |
|---|---|---|---|
| toa | Trans | hfn | 15 Oct. 03 |
| Description | | | |
| Estimated TOA of the T-burst start | | | |
| Interacts with | | Subscribers | |
| T algo, receiver host, ZRE, calculation of position | | fam, dck, bli | |
| Update rate | Representation | | |
| ca. t_burstperiod | 64-bit unsigned Integer (LE) | | |
| Comment | | | |
| In ps since system start; only for calculation of position | | | |

FIGURE 8i

DEVICE AND METHOD FOR DETERMINING A CORRELATION MAXIMUM

BACKGROUND OF THE INVENTION

1. Field of the Invention

The present invention relates to devices and methods for determining correlation maxima, which are useable, in particular, for digital transmission systems.

2. Description of Prior Art

For a receiver in a digital transmission system to be able to synchronize to a digital signal sent out by a transmitter, the transmitter radiates a digital signal known to the receiver. The receiver's task is to determine the precise time of arrival (TOA) of the signal sent. To determine the time of arrival, the cross-correlation between the digital receive signal and the known digital transmit signal is calculated. Subsequently, the magnitude maximum of the cross-correlation is detected, and the time of arrival of the transmit signal is determined from the position of the correlation magnitude maximum.

If a correlation magnitude maximum is to be searched for in a predefined range of correlation magnitude values and/or in a predefined range of indices 1 of a correlation signal, the correlation magnitude maximum may be determined by determining the maximum of all correlation magnitudes present within the predefined range.

However, if a correlation magnitude maximum is to be searched for across a continuous signal, i.e. across a stream of samples, assessments must be made continuously as to whether or not the correlation magnitude that has just been calculated represents a valid local maximum. To determine such a local maximum, a specified threshold value may be used along with the rule that a correlation magnitude maximum is at hand when a correlation magnitude to be assessed exceeds the threshold value. However, such a method is not flexible and imprecise since it offers no possibility of adjustment to a changing transmission channel. Thereby, the determination of the correlation magnitude maximum may be flawed. As a result of a flawed determination of the correlation magnitude maximum, a synchronization between a transmitter and a receiver of a transmission system is not possible, or there may be flawed data transmission.

SUMMARY OF THE INVENTION

It is the object of the present invention to provide a device for ascertaining a threshold value for determining whether a correlation magnitude value is a correlation maximum value, a device for detecting a correlation maximum value as well as a method and a computer program for ascertaining a threshold value for determining whether a correlation magnitude value is a correlation maximum value as well as for detecting a correlation maximum value, which enable a reliable determination of a correlation maximum value from a sequence of correlation magnitude values.

In accordance with a first aspect, the invention provides a device for ascertaining a threshold value for determining whether a correlation magnitude value, to be assessed, from a sequence of correlation magnitude values is a correlation maximum value, the device having:
a determiner for determining a reference value from correlation magnitude values within a interval of the sequence of correlation magnitude values, the value to be assessed being external to interval; and
a determiner for determining the threshold value in dependence on the reference value.

In accordance with a second aspect, the invention provides a device for detecting a correlation maximum value from a sequence of correlation magnitude values, having:
a device for ascertaining a threshold value for determining whether a correlation magnitude value, to be assessed, from a sequence of correlation magnitude values is a correlation maximum value, the device having:
a determiner for determining a reference value from correlation magnitude values within a interval of the sequence of correlation magnitude values, the value to be assessed being external to interval; and
a determiner for determining the threshold value in dependence on the reference value;

and
a comparator for comparing the correlation magnitude value to be assessed with the threshold value ascertained for the correlation magnitude value to be assessed, the comparator being configured to provide a trigger signal in dependence on the comparison result, the trigger signal indicating whether a correlation magnitude value to be assessed is a correlation maximum value.

In accordance with a third aspect, the invention provides a method for ascertaining a threshold value for determining whether a correlation magnitude value, to be assessed, from a sequence of correlation magnitude values is a correlation maximum value, the method including the steps of:
determining a reference value from correlation magnitude values within an interval of the sequence of correlation magnitude values, the magnitude to be assessed being external to interval; and
determining the threshold value in dependence on the reference value.

In accordance with a fourth aspect, the invention provides a method for detecting a correlation maximum value from a sequence of correlation magnitude values, the method including the steps of:
ascertaining a threshold value for determining whether a correlation magnitude value, to be assessed, from a sequence of correlation magnitude values is a correlation maximum value, with the following steps:
determining a reference value from correlation magnitude values within an interval of the sequence of correlation magnitude values, the magnitude to be assessed being external to interval; and
determining the threshold value in dependence on the reference value;

and
comparing a correlation magnitude value to be assessed with the threshold value ascertained for the correlation magnitude value to be assessed, and, depending on the comparison result, providing a trigger signal, the trigger signal indicating whether a correlation magnitude value to be assessed is a correlation maximum value.

In accordance with a fifth aspect, the invention provides a computer program having a program code for performing the method for ascertaining a threshold value for determining whether a correlation magnitude value, to be assessed, from a sequence of correlation magnitude values is a correlation maximum value, the method including the steps of:
determining a reference value from correlation magnitude values within an interval of the sequence of correlation magnitude values, the magnitude to be assessed being external to interval; and
determining the threshold value in dependence on the reference value,
when the computer program runs on a computer.

The present invention is based on the findings that a local maximum which clearly stands out from a correlation floor, the noisy mean value of the correlation magnitudes, may be determined in a reliable manner in that the correlation floor is continuously calculated by taking the mean while leaving out the correlation magnitude value currently to be assessed, and in that a decision as to a maximum is effected on the basis of the correlation floor currently calculated.

The inventive approach enables reliable recognition of a correlation magnitude maximum value in a sequence of correlation magnitude values. In particular, even correlation magnitude maximum values in an indefinitely continuing sequence of correlation magnitude values may be reliably detected. This is advantageous for reliably determining, in a transmission system, the time of arrival TOA of a sequence of transmissions used for synchronization in a receiver. An essential advantage of the inventive approach is the continuous ascertainment and consideration of external interference effects when calculating the threshold value for determining the correlation magnitude maximum value. Thereby, the threshold value is adjusted in a flexible manner to changing channel properties.

In accordance with one embodiment, the correlation floor ascertained is weighted with a predefined factor. A favorable choice of this threshold-value factor here is dependent on the transmission system contemplated. The use of a threshold-value factor has the advantage that a maximum clearly standing out from the correlation floor is regarded as an actual correlation magnitude maximum and may be used for determining the time of arrival.

In accordance with a further embodiment, the correlation floor is continuously calculated in that an averaging window divided into two is placed around the position of the correlation magnitude value to be assessed, and in that averaging is performed with regard to the correlation magnitude values within the divided averaging window. A division of the averaging into two, i.e. the averaging of the correlation floor both before and after the possible correlation peak, is advantageous for avoiding an erroneous detection with a sudden rise of the correlation floor. Such a rise within very few up to one single sample may occur, for example, when in the receive signal, there is initially only receiver noise, but then a very strong interferer begins to transmit. The correlation magnitudes would then increase step up without there being a correlation peak. In fact, however, the higher correlation magnitudes caused by the interferer are also to be considered as an elevated correlation floor, within which a peak of the signal searched for is to be searched. To prevent a stepped rise of the correlation floor from being erroneously detected as a peak which stands out from the previous correlation floor many times over, it is advantageous to place an averaging window both before and after the possible position of a correlation peak.

In accordance with a further embodiment, a predetermined latency period is adhered to after detecting a correlation magnitude maximum, during which latency period no further correlation magnitude maximum may be detected. Such a latency period has the advantage that with a multi-path channel, correlation maxima of subsequent paths will not be detected. The latency period here depends on an expected distance between two successive correlation maxima, which distance in turn results from an arrangement of transmit signal sequences, used for a synchronization, within the signal sent out.

In accordance with a further embodiment, a reversal point of the correlation magnitude curve is ascertained. In particular, a reversal point is determined immediately before a major maximum detected. Determining the reversal point has the advantage that the time of arrival may be determined with considerably more accuracy, since with suitable transmit signals, the reversal point is clearly less sensitive towards multi-path propagation than is the correlation magnitude maximum. This means that subsequent paths have less influence on the position of the reversal point than on the position of the maximum. In addition, the reversal point is more robust against the noise.

BRIEF DESCRIPTION OF THE DRAWINGS

Preferred embodiments of the present invention will be explained below in more detail with reference to the accompanying figures, wherein:

FIG. 8A to 8I are overviews of the parameters used in the embodiment shown in FIG. 7.

DESCRIPTION OF PREFERRED EMBODIMENTS

Figure 1:
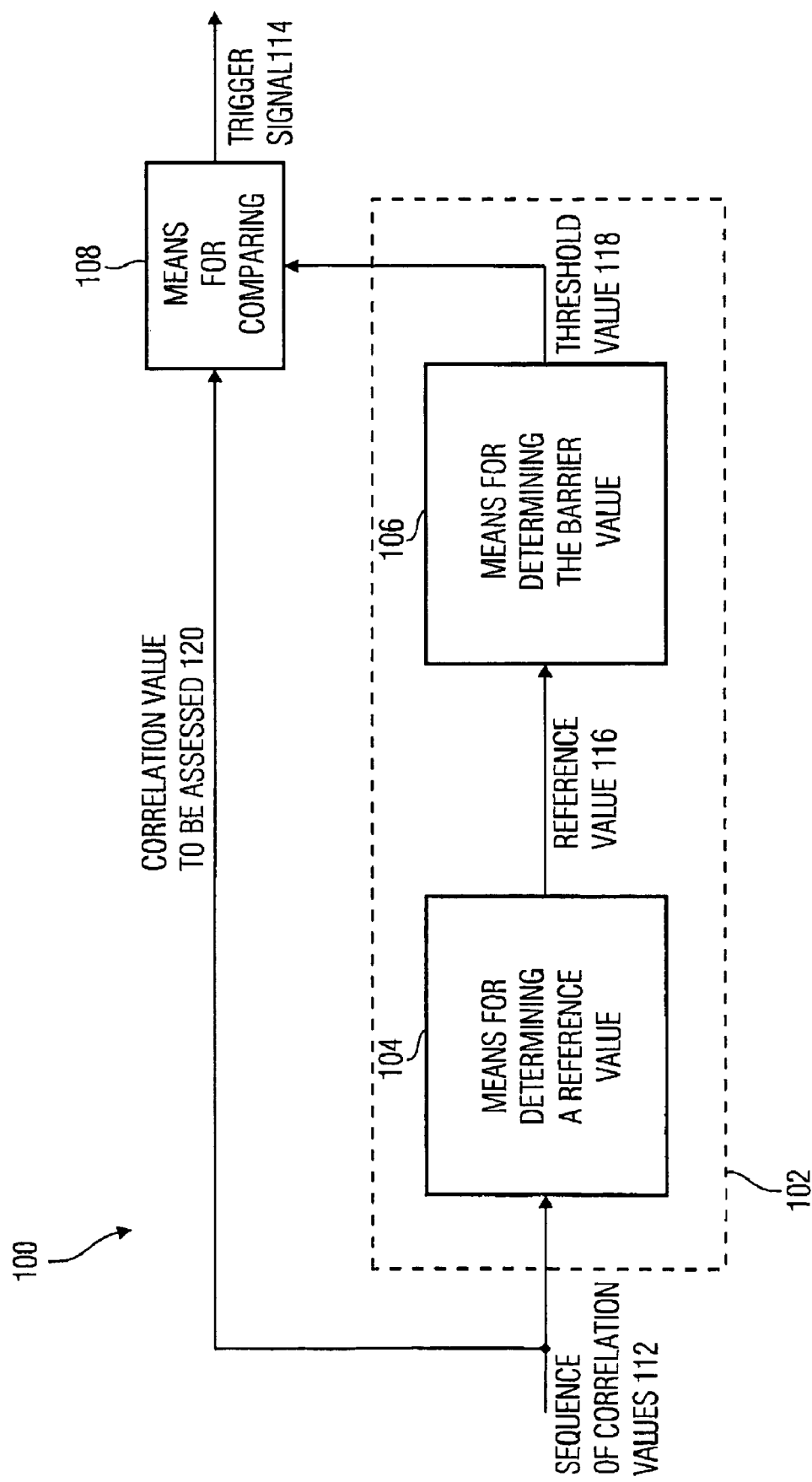
FIG. 1 shows a device for detecting a correlation maximum value with a device for ascertaining a threshold value in accordance with an embodiment of the present invention.

In the following description of the preferred embodiments of the present invention, identical or similar reference numerals will be used for those elements which are represented in the various drawings and have similar actions, a repeated description of these elements being dispensed with.

FIG. 1 shows a block diagram of a device 100 for detecting a correlation maximum value with a device 102 for ascertaining a threshold value in accordance with an embodiment of the present invention. In accordance with this embodiment, the device 100 for detecting a correlation maximum value is part of a receiver (not shown in FIG. 1) of a data transmission system. For synchronizing the receiver to a signal received, the receiver continuously performs a cross-correlation between values of the signal received and known transmit signal values stored in the receiver, which typically occur periodically in the signal received. The correlation magnitudes calculated in the receiver form a continuous correlation magnitude values signal, i.e. a stream of correlation magnitude values samples. A correlation maximum value is searched for from the sequence of correlation magnitudes so as to determine the time of arrival of the searched-for signal consisting of the known transmit signal values. Subsequently, a correlation magnitude value, currently at hand or currently to be assessed, from the sequence of correlation magnitude values, will be referred to as a correlation magnitude value to be assessed.

The device 102 for ascertaining a threshold value for determining whether a correlation magnitude value to be assessed is a correlation maximum value comprises a means 104 for determining a reference value and a means 116 for determining a threshold value. The device 100 for detecting a correlation maximum value further comprises a means 108 for comparing.

The device 100 for detecting a correlation maximum value is configured to receive a sequence of correlation magnitude values 112. The sequence of correlation magnitude values 112 is received by means 104 for determining a reference value. Means 104 for determining a reference value is configured to form a reference value 116 from a subrange of the sequence of correlation magnitude values 112 and to provide said reference value 116 to means 106 for determining the threshold value 118.

Means 106 for determining the threshold value is configured to determine the threshold value 116 in dependence on the reference value 116 and to provide said threshold value 118 to means 108 for comparing.

Means 108 for comparing is configured to compare a correlation magnitude value 120, currently to be assessed, from the sequence of correlation magnitude values 112 with the threshold value 118. Depending on a comparison result, means 108 for comparing is configured to provide a trigger signal 114. The trigger signal 114 indicates whether the correlation magnitude value 120 assessed is a correlation maximum value or a correlation maximum, or is no correlation maximum. For this purpose, means 108 for comparing is configured to compare the correlation magnitude value 120 to be assessed with the threshold value or barrier value 108. In accordance with this embodiment, the trigger signal 114 indicates a maximum when the correlation magnitude value 120 to be assessed exceeds the threshold value 118.

In accordance with this embodiment, means 104 for determining a reference value is configured to form the reference value 116 from correlation magnitude values of the sequence of correlation magnitude values 112, which are within a subrange or interval of the sequence of correlation magnitude values 112, the correlation magnitude value 120 to be assessed being external to interval. Means 104 for determining the reference value 116 is configured to form the reference value 116 by means of a combination, for example an averaging of the correlation magnitude values within the interval of the sequence of correlation magnitude values 112. In accordance with this embodiment, an arithmetic mean value is formed from the correlation magnitude values within the interval in means 104 for determining a reference value. Reference value 116 thus corresponds to the correlation floor or the noisy mean value of the correlation magnitudes within the interval, from which the reference value 116 is formed.

In accordance with a further embodiment (not shown in FIG. 1), a further reference value is formed, in the means for determining a reference value, from correlation magnitude values within a further interval of the sequence of correlation magnitude values, the correlation magnitude value to be assessed being between the interval and the further interval. In accordance with this embodiment, a common reference value is determined in dependence on the reference value and the further reference value. This may be effected, for example, by means of arithmetic averaging from the reference value and the further reference value. Here, a plurality of correlation magnitude values of the sequence of correlation magnitude values may lie between the interval and the further interval. In accordance with this embodiment, the correlation magnitude value to be assessed is arranged centrally between the interval and the further interval, and the interval and the further interval are equal in size.

Means 106 for determining the threshold value 108 is configured to determine the threshold value 118 in dependence on the reference value 116. In order that a correlation magnitude value 120 to be assessed can be regarded as an actual correlation magnitude maximum and can be used for determining the time of arrival of the transmit sequence, the correlation magnitude value 120 to be assessed must meet the criterion that its peak be higher, by a predefined factor, than the correlation floor. The correlation floor is determined by reference value 116. Therefore, threshold value 118 is multiplied, in accordance with this embodiment, by means of multiplying the reference value 116 by a threshold-value factor. The threshold-value factor, or weighting factor, is dependent on the transmission system contemplated. Means 106 for determining the threshold is configured to weight the reference value 116 with the predetermined weighting factor and to ascertain the threshold value 118 therefrom. The weighting factor may be permanently stored within means 106 for determining the threshold value, or may be variably adjustable.

Figure 2:
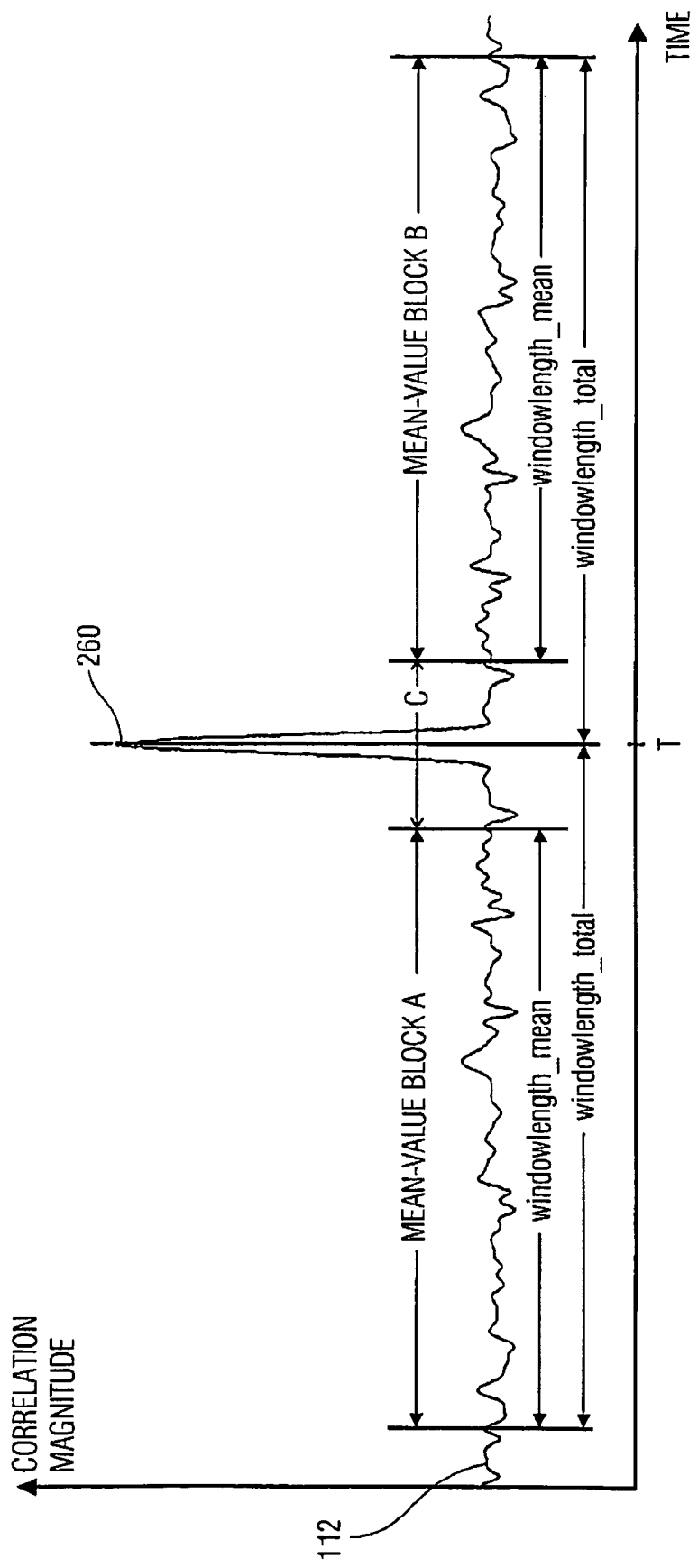
FIG. 2 is a graphic representation of a correlation magnitude signal.

FIG. 2 shows the course of a continuous calculation of the correlation magnitudes. The sequence of correlation magnitude values 112 consists of temporally successive correlation magnitude values plotted in a horizontal time axis. The absolute value of the correlation magnitude values is plotted in a vertical direction. The sequence of correlation magnitude values 112 exhibits a very large number of local maxima, which, however, stem from noise and other undesirable effects. Only one local maximum 260 clearly stands out from the correlation floor, the noisy mean value of the correlation magnitudes.

In order to decide whether a correlation maximum value is at hand at a time T, the correlation floor is contemplated before and after time T. Alternatively, it is also possible to contemplate the correlation floor before time T only. This enables a faster determination as to whether a correlation magnitude value to be assessed is a correlation magnitude maximum value. It is possible to dispense with contemplating the correlation floor after time T, in particular, when suddenly rising correlation-floor values may be excluded in a transmission system.

In accordance with FIG. 2, time T defines the time of arrival or the time of assessment of the correlation magnitude value 260 to be assessed, which is a correlation magnitude maximum value in FIG. 2. In accordance with this embodiment, the correlation floor across mean-value block A is calculated, on the one hand, and the correlation floor across mean-value block B is calculated, on the other hand.

The mean-value blocks A, B designate two subintervals of the sequence of correlation magnitude values 112, of which a reference value is calculated, respectively. In accordance with this embodiment, the interval sizes of the mean-value blocks A, B are the same and have a width windowlength_mean. Thus, there are an equal number of correlation magnitude values or samples of the sequence of correlation magnitude values 112, respectively, in the mean-value blocks A, B.

Alternatively, mean-value blocks A, B may have different sizes. Mean-value blocks A, B are spaced away from time T, which corresponds to the correlation magnitude value, to be assessed, of the sequence of correlation magnitude values 112. It may be seen from FIG. 2 that a predefined area C around point T is left out so as to avoid erroneous decisions being made. The non-used area C before and/or after the point T contemplated in each case is a number of correlation magnitude values or samples, the number of which corresponds to the difference windowlength_total−windowlength_mean.

The parameter windowlength_total defines the number of samples between time T and that correlation magnitude value sample in mean-value blocks A, B which is furthest away from point T.

Figure 3:
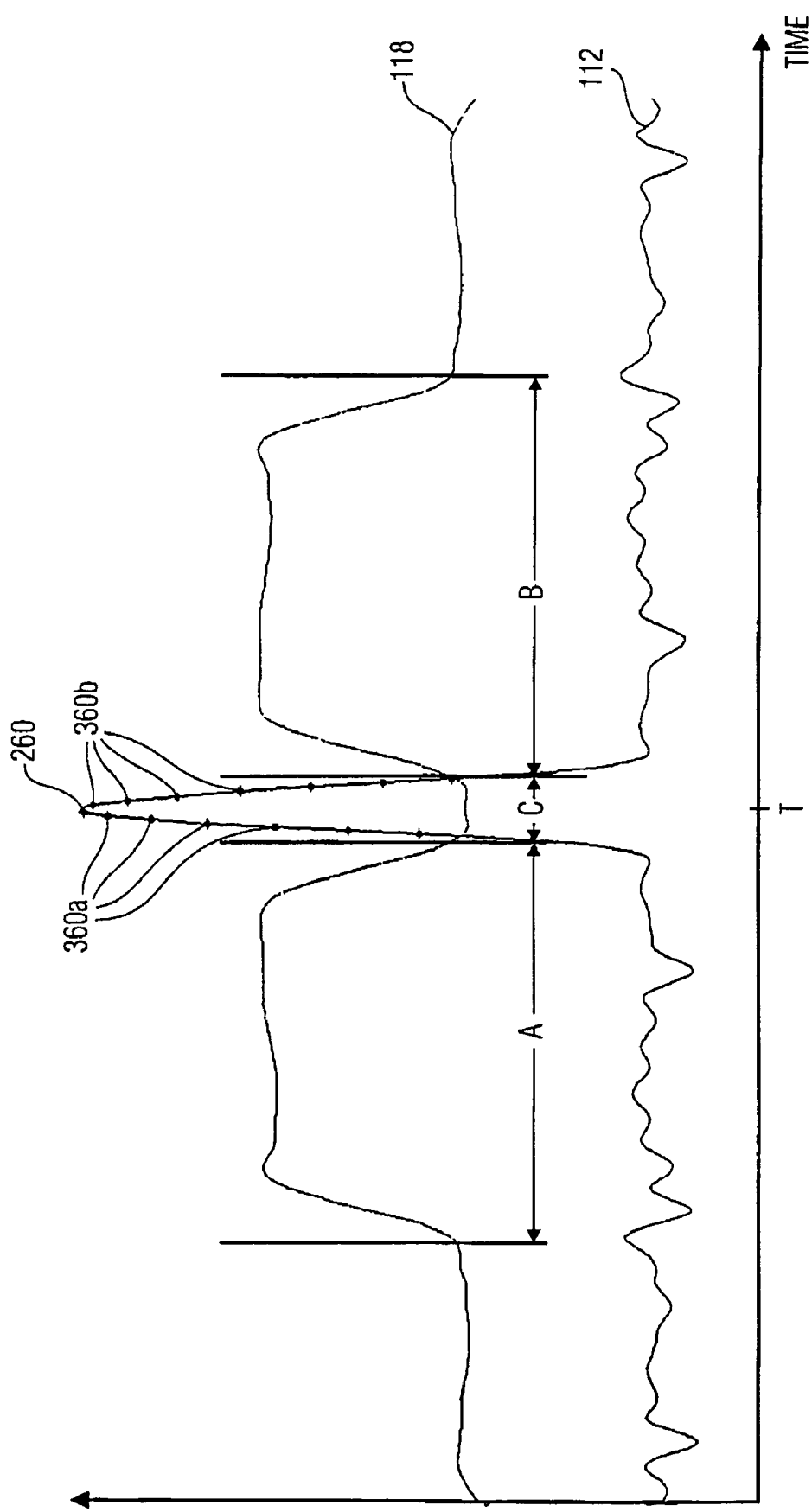
FIG. 3 is a further graphic representation of the correlation magnitude signal with a sliding-window mean.

FIG. 3 shows a further graphic representation of the sequence of correlation magnitude values 112, also referred to as corr below, as well as a time curve of the threshold values 118 which correspond to the weighted reference values 116 and/or the weighted correlation floor. Since both the reference values 116 and the threshold value 118 are continuously calculated for each correlation magnitude value 120 to be assessed, the reference values 116 and the threshold values 118 are a continuous sequence of individual samples, in accordance with the sequence of correlation magnitude values 112. In the following, the correlation floor will also be referred to by mean_corr, and the weighting factor for weighting the reference value 116 will be referred to by peakmean_tresh.

It may be seen from FIG. 3 that the sequence of correlation magnitude values 112 consists of a multiplicity of individual correlation magnitude values, or samples, 360a, 360b. Correlation magnitude values which are arranged temporally before the correlation magnitude value 260 are referred to by reference numeral 360a, and correlation magnitude values successive in time are referred to by reference numeral 360b. In accordance with FIG. 2, the mean-value blocks A, B around the correlation magnitude value 260, to be assessed, at time T, are referred to by A, B. The interval C, in turn, indicates the distance between the mean-value blocks A, B, the correlation magnitude value 260 to be assessed being arranged in the center of the interval C.

It becomes clear from FIG. 3 why a certain area C around the sample 260 contemplated, at time T, is not taken into account in the calculation of the correlation floor. The empty space C results in that the detection of the correlation maximum value 260 becomes easier, since in the area C, the correlation floor is considerably lower than in areas A, B, wherein the influence of the peak entails a clear rise in the correlation floor. This effect goes back to the choice of the transmit sequence, which results in the correlation peak. Sequences causing a correlation peak, in the direct surroundings of which the correlation flow is minimal, are preferably used for such correlation sequences. Therefore, the width of interval C is determined in dependence on the correlation sequences used which cause the correlation peak utilized for synchronization.

Figure 4:
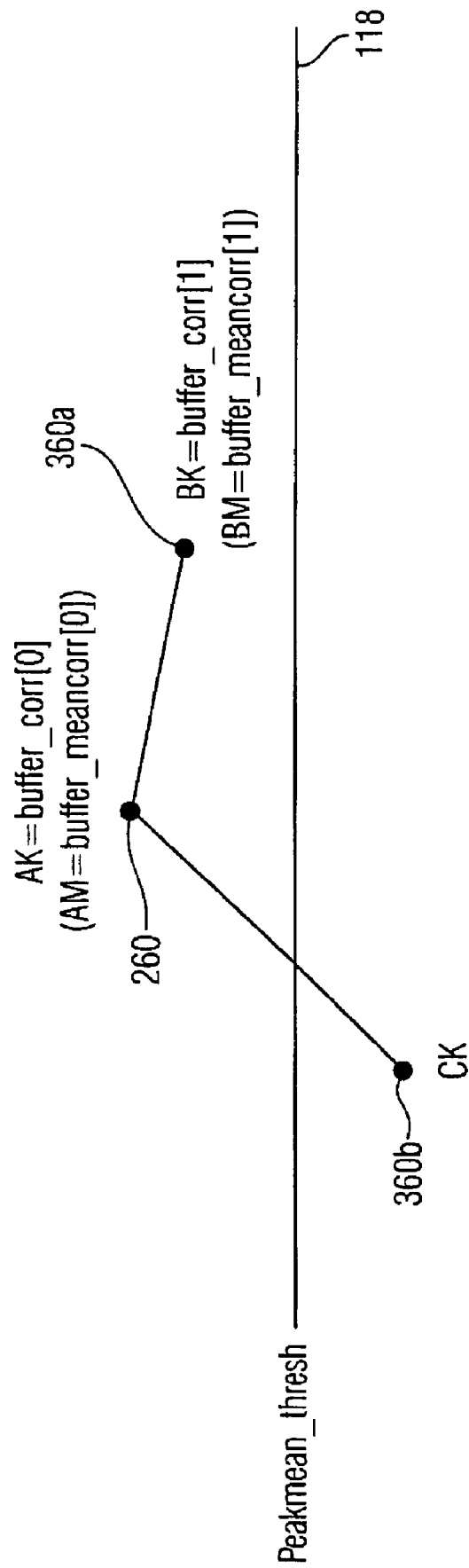
FIG. 4 is a graphic representation of a correlation magnitude maximum.

FIG. 4 illustrates a further criterion of detecting a maximum in the continuous signal processing. Before a decision is made, in accordance with this embodiment, as to whether a new maximum is at hand for which a trigger signal is given to the external, several conditions need to be met in order to avoid a detection of wrong peak. For this purpose, in addition to the correlation magnitude value 260 currently to be assessed, a further correlation magnitude value 360a is temporally stored in a memory (not shown in the figures) along with the correlation-floor values or threshold values ascertained for these values 260, 360a.

Subsequently, AK and BK shall be correlation magnitude values samples placed in a memory buffer_corr (not shown in the figures). AM and BM shall be the associated values of the correlation floor in a memory buffer_meancorr (not shown in the figures). AK is to refer to the oldest sample, and BK is to refer to that sample, included into the current step, in the sequence of correlation magnitude values 112 with which the maximum-related decision for AK is to be made. It can be seen from FIG. 4 that the correlation magnitude values AK, BK are both above the threshold value 118 and are thus potential correlation maximum values. In order to decide whether one of the correlation magnitude values AK, BK is a correlation maximum value, both samples AK and BK are required in the memory buffer_corr. For a maximum, the contemplated sample AK must be larger than or equal to the sample BK which has been read in last.

For determining a time of arrival of a signal sequence with a multi-path channel, one should only ever contemplate the arrival of the first signal path. Therefore, only the first maximum which meets the above criteria is of interest in the detection of the correlation magnitude maximum. Preferably, therefore, the detector is switched off for a certain latency period after the first maximum has been detected in order that the subsequent paths are not detected. Since the transmitter usually periodically radiates the sequence known in the receiver and used for correlation so as to enable a continuous determination of position and/or of the TOA, the detector is switched on again after the latency period has expired so as to be able to determine the time of arrival for the arrival of the next transmit signal.

Figure 5A:
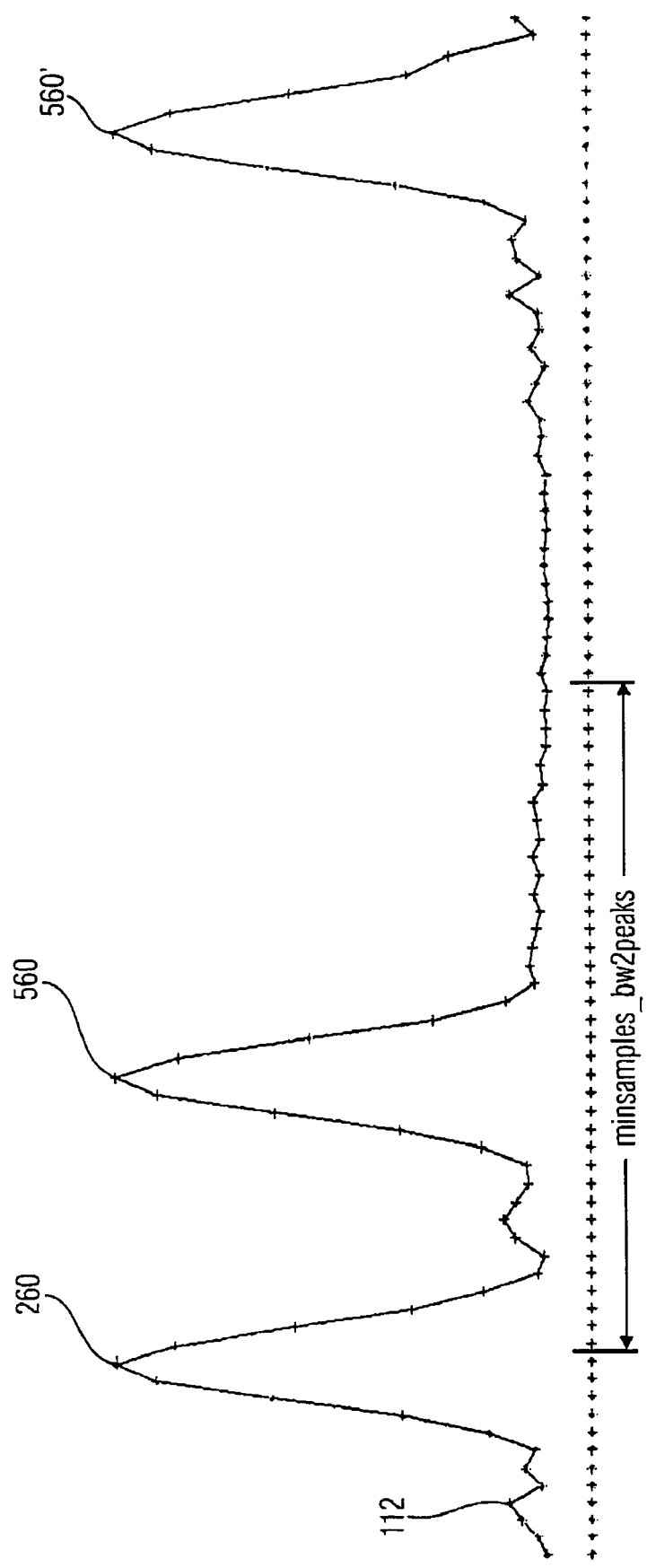
FIG. 5a is a graphic representation of a correlation magnitude signal.

FIG. 5a shows part of the sequence of correlation magnitude values 112 and shows, in particular, three maximal correlation magnitude maximum values 260, 560, 560', wherein the correlation maxima 260, 560' correspond to actual correlation maxima, but the correlation maximum 560 has been caused by a multi-path propagation and is thus not a valid maximum for synchronization. With multi-path propagation, in addition to the detection of maximum of the direct path, one or even several additional peaks may be detected, with a certain delay, for which the trigger signal is not to be set, however. In this embodiment, the trigger signal is set equal to 1, when a valid correlation maximum value has been detected. To prevent the trigger signal from being reset with a maximum caused by multi-path propagation, the detection means is deactivated for a predefined latency period. In this embodiment, the latency period is indicated by minsamples_bw2peaks. The external parameter minsamples_bw2peaks is needed for indicating how many samples of the correlation sequence 112, at a minimum, need to exist between two valid peaks 260, 560' to enable giving the trigger signal to the outside. For this purpose, the time of the last valid maximum value detected is stored, and an internal parameter samples_lastpeak is set to a value of 0, if the last peak detected occurred as early as at least minsamples_bw2peaks samples ago. For all other values between 1 and minsamples_bw2peaks−2 of the parameter samples_lastpeak, no new maximum is detected, although other conditions would possibly be met. In FIG. 5a, the correlation peak 560 is not detected as a valid combination maximum, since the correlation magnitude value 560 lies within the interval minsamples_bw2peaks after the correlation magnitude value 260 detected as a valid maximum.

In accordance with a further embodiment, the combination value magnitudes, or signals, from which the correlation magnitude values are ascertained, are up-sampled to perform the detection of the correlation magnitude maximum in a manner which is more refined than in the sample clock. This does not represent anything other than a special form of interpolation between the associated correlation magnitude values in the sample clock. Thus, an increase in the accuracy of the estimation of the time of arrival may be achieved in that the complex correlation magnitude values are up-sampled, for example after combining partial correlations. This is usually effected by means of zero insertion and low-pass filtering. Subsequently, the magnitude of the up-sampled complex correlation magnitude values is calculated, and this magnitude is used for further operations. On account of the upsampling filter, samples may turn negative. However, for negative values, there can be no correlation peak, which is why cases for which the samples are smaller than zero are excluded. Valid correlation magnitude values must be larger than zero.

In order that a new correlation maximum value may be recognized at the time of sample BK in FIG. 4, the following conditions must be met. As the first condition, the last peak detected must have occurred more than minsamples_bw2peakssamples ago, that is samples_lastpeak>minsamples_bw2peaks−1 must apply and thus, samples_lastpeak=0 must apply in the algorithm. Thereby, interference effects due to multi-path propagation are reduced.

As the second condition, the correlation magnitude value AK and the correlation floor AM in FIG. 4 need to be larger than zero.

As the third condition, the correlation magnitude value AK in FIG. 4 must be larger than the weighting factor peakmean_thresh multiplied by the correlation-floor value AM, that is AK>peakmean_thresh*AM must apply. This ensures that the correlation magnitude value AK is above the threshold value.

As the fourth condition, AK must be larger than or equal to BK, i.e.

AK≧BK must apply.

The first condition already results in that all points directly subsequent to the detected maximum, for which points the fourth condition would also be met, are already excluded. If the first condition did not exist, one would need the three samples AK, BK and CK in accordance with FIG. 4 for detecting a maximum. In this case, there would be a maximum at AK if in FIG. 4, sample CK were smaller than sample AK, and if the latter would at the same time be larger than or equal to sample BK.

If all four conditions are met, the trigger signal trigger=1 is set, and the ratio peak2mean of the value AK to AM is transferred to a central arithmetic unit (not shown in the figures).

Figure 5B:
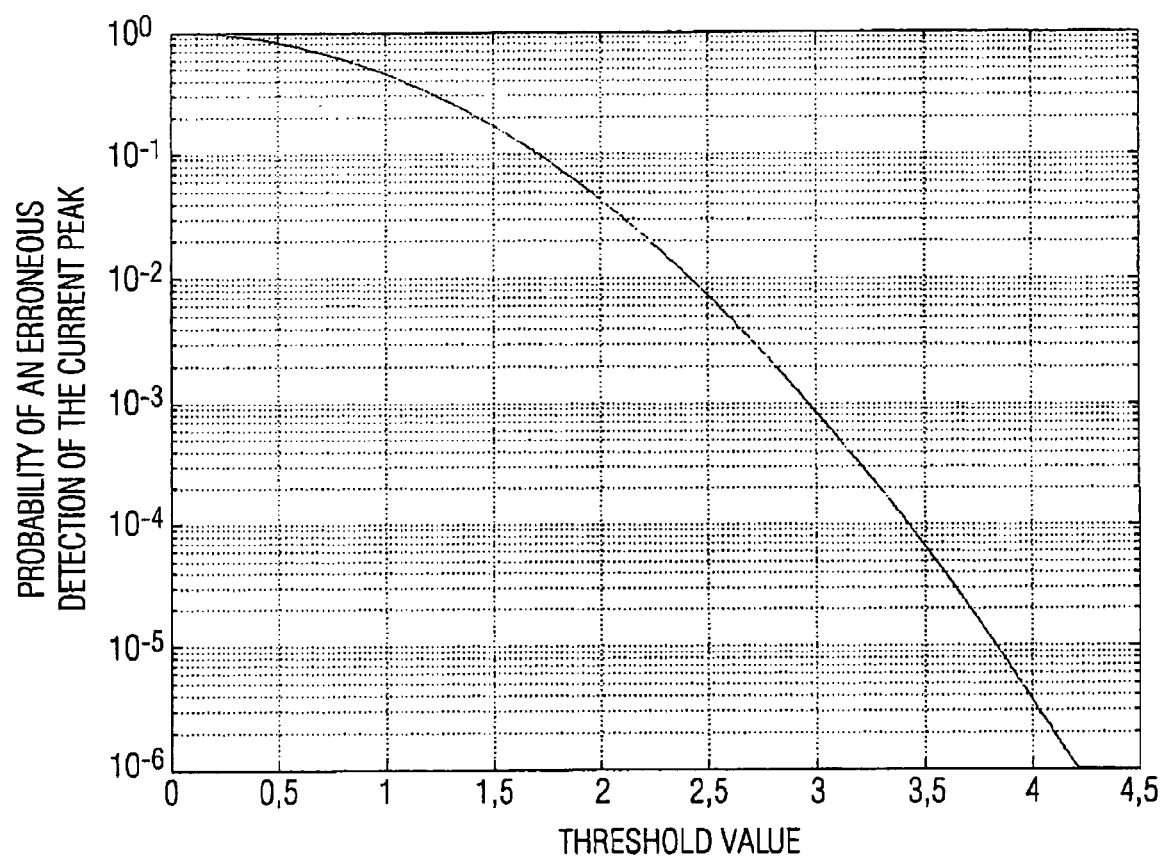
FIG. 5b is a graphic representation of a connection between the detection of a correlation peak in dependence on the threshold value.

FIG. 5b shows a graphic representation illustrating the probability of an erroneous detection of a correlation peak in dependence on the threshold value. On the horizontal axis, the threshold value is indicated relative to the correlation value. The error probability shown in FIG. 5b applies to an individual correlation value picked out at random, which is possibly a candidate for a correlation peak. If, thus, a correlation peak is to be detected in a sequence of correlation values, the probability of an erroneous detection is increased accordingly.

Beside the estimated time of arrival on account of a detected correlation peak, a quality of this estimation may also be provided. For this purpose, in accordance with an embodiment, the ratio of the correlation peak, i.e. of a correlation magnitude value recognized as a maximum, to the associated correlation floor is calculated. The larger this value, the more reliable the detection of the maximum has been. Alternatively, the current signal-to-noise ratio SNR may be estimated. In accordance with an embodiment of the present invention, such an SNR estimation is used, and the estimated SNR is output as a quality value, so as to be able to assess the reliability of the detection of a maximum.

The SNIR estimation (SNIR=signal to noise plus interference ratio) is a suitable measure of quality when there is only one propagation path and/or when the first path is considerably stronger than the following ones and/or when all the following paths arrive considerably later than the first path and are weaker than same. With specific settings, the SNIR estimation is reliable for SNIRs between −20 db and +10 db. For ascertaining the SNIR estimation, the maximum of the squared correlation magnitudes in the sub-sample raster is determined.

An estimation of the average immunity to noise, interferences and other sources of disturbance such as quantization and intermodulation occurs during the entire burst received. To this end, only the first solvable path is contemplated as a useful signal. All subsequent paths are treated as interferences. Accordingly, a high SNR may be estimated when two paths are unsolvably close together. Nevertheless, the second path may highly corrupt the TOA estimation of the first path. The consequence thereof is that the SNIR quality measure is suitable only for solvable paths, the first one of which is the strongest.

In the SNIR estimation, and when keying-in a bit into a long burst, errors arise due to three influences. Firstly, the energy of the radiated-off sequence is very slightly different for a transmitted bit=0 than for a transmitted bit=1. In addition, an error arises when the exact correlation peak is not found during sampling, but when only a point on its edge is found. In addition, a frequency offset leads to an error.

In accordance with a further embodiment, a reversal point before the main maximum in the window contemplated is searched for on the correlation magnitude sequence 112. This means that firstly, the main maximum is determined, subsequently, one goes back in time on the correlation magnitude curve 112 until the first reversal point is found. For the search for the reversal point, the first and second differentiations of the correlation magnitude function 112 are required. Since this function is at hand in a sampled manner only, the differentiations may only be calculated in an approximative and, also, in a sampled manner. Thus, the location of the reversal point initially is detectable only in the oversampling raster or in the sampling raster. In order to determine the location of the reversal point in a highly precise manner, a, for example, linear interpolation between the samples and/or the sample times around the reversal point eventually also needs to be performed. From this very highly resolved estimation of the reversal-point position, the time of arrival may eventually be determined in a highly precise manner. An interpolation between adjacent samples may be taken from FIG. 5a, for example. Individual samples for example, the maximum correlation magnitude values 260, 560, 560' are marked by crosses, and the continuous line connecting the individual samples represents an interpolation of the individual samples.

Figure 6:
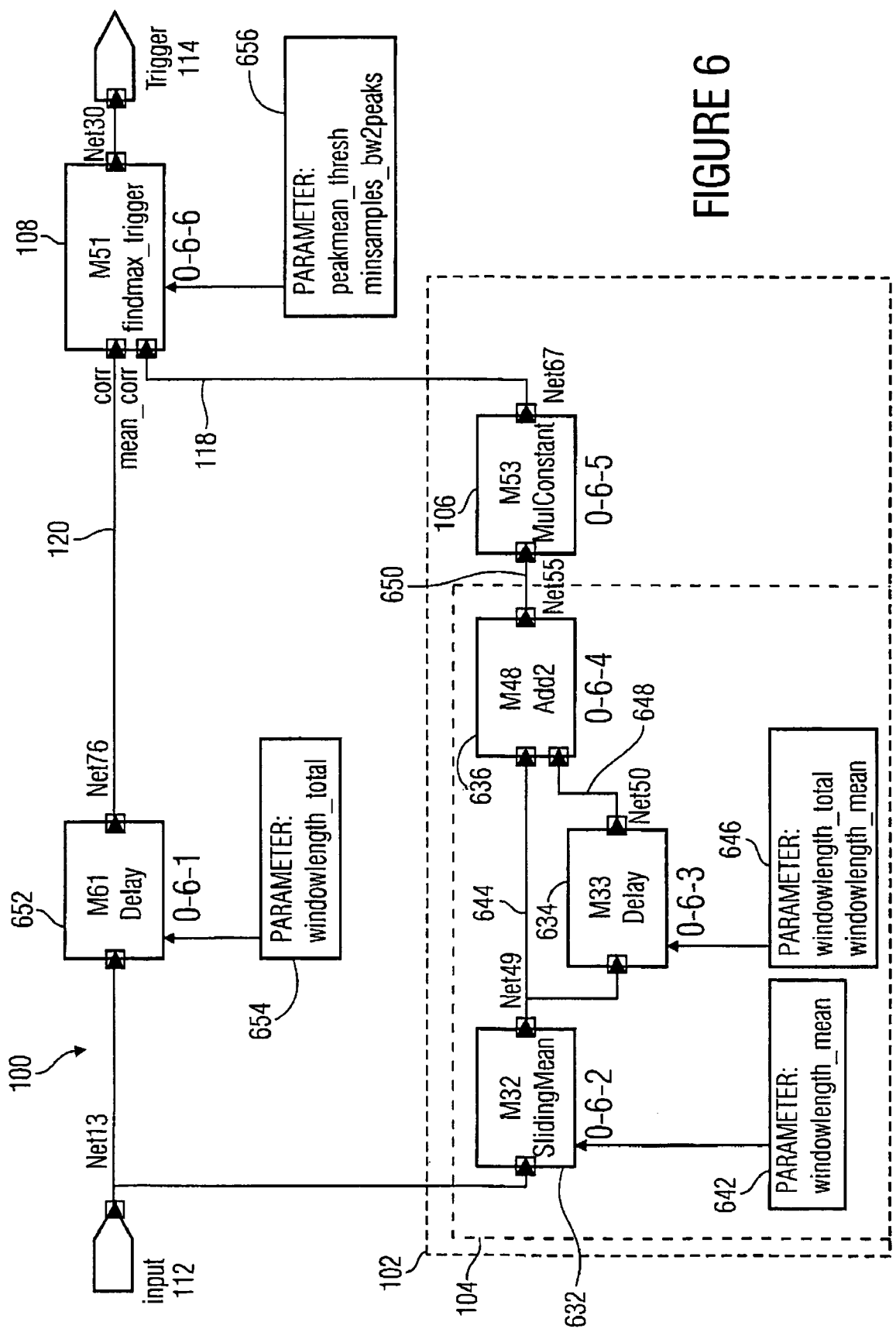
FIG. 6 is a block diagram of a device for detecting a correlation maximum value in accordance with a further embodiment of the present invention.

FIG. 6 shows a diagrammatic representation of a further embodiment of a device 100 for detecting a correlation maximum value from a continuous sequence of correlation magnitude values 112. The sequence of correlation magnitude values 112 is provided as an input 112 to device 100 for detecting. Depending on the detection of a correlation maximum value, the trigger signal 114 is output. The device 100 for detecting the correlation maximum value comprises a device 102 for ascertaining the threshold value with a means 104 for determining a reference value and a means 106 for determining a threshold value. In addition, the device 100 for detecting a correlation maximum value comprises a means 108 for comparing the threshold value 118 with the correlation magnitude value 120 to be assessed.

In this embodiment, means 104 for determining a reference value comprises a means 632 for forming a moving mean value, a delaying means 634 and an addition means 636. The means 632 for forming a continuous mean is configured to continuously form a mean of received correlation magnitude values of the sequence of correlation magnitude values 112. The mean value is formed of an interval length determined by the parameter 642 windowlength_mean. A moving mean currently provided is provided to the addition means 636 and to the delaying means 634 as a first reference value 644. The delaying means 634 is configured to delay the received reference value 644 by a number of samples, the number of which depends on the parameter 646 windowlength_total and windowlength_means. The delaying means 634 is configured to provide the delayed reference value to the addition means as a second reference value 648. The addition means 636 is configured to add the first reference value 644, which has been formed from a first interval, and the second reference value 648, which has been formed from a less recent interval, and to provide this, as a reference value 650, to means 106 for determining the threshold value 118. In this embodiment, means 106 for determining the threshold value is a multiplying means which multiplies the reference value 650 with a predetermined constant, and provides the product as a threshold value 118 to means 108 for comparing. Alternatively, a weighting of the reference value 650 may also be performed in means 108 for comparing.

Device 100 for detecting a correlation maximum value comprises a further delaying means 652 configured to delay the correlation magnitude values of the sequence of correlation magnitude values 112 by a number of samples defined by the parameter 654 windowlength total and to provide them to means 108 for comparing. This ensures that means 108 for comparing receives, at a defined assessment time, a correlation magnitude value 120 to be assessed and a threshold value 118 calculated with regard to the correlation magnitude value 120 to be assessed. Additionally, parameters 656 peakmean_thresh and minsamples_bw2peaks are provided to means 108 for comparing.

In the following description of device 100 for detecting a correlation maximum value, the further delaying means 652 will be referred to as block 0-6-1, means 632 for calculating the mean will be referred to as block 0-6-2, the delaying means 634 will be referred to as block 0-6-3, the addition means 636 will be referred to as block 0-6-4, the multiplying means 106 as block 0-6-5, and the means for comparing 108 as block 0-6-6. The sequence of correlation magnitude values 112 is provided to block 0-6-1 and to block 0-6-2 via the signal Net13. Block 0-6-1 is connected to block 0-6-6 via the signal Net76. Blocks 0-6-3 and 0-6-4 are connected to block 0-6-2 via Net49. Block 0-6-3 is connected to block 0-6-4 via Net50. Block 0-6-4 is connected to block 0-6-5 via Net55, and block 0-6-5 is connected to block 0-6-6 via Net67. In a simulation environment (not shown in the figures) of data type, the nets mentioned may be real and may comprise a data rate B_block_4(tbc).

The device 100 for detecting a correlation maximum is referred to as block 0-6. In block 0-6, all correlation maxima are to be found, and a trigger pulse is to be given to a functional level 0 (not shown in the figures) for each maximum found. The output trigger of this level thus only possesses the value of 0 if no new maximum is detected, and the value of 1 in the event of a maximum being detected. In order to find all correlation peaks in the correlation signal Input 112, and to output a trigger pulse in response to finding a correlation peak, the correlation floor of the input signal Input first needs to be calculated at level 0-6, with the help of which correlation floor a decision may be taken per sample, at the end of this level in block 0-6-6, as to whether or not there is a new maximum. For calculating the correlation floor in means 104, parameters windowlength_mean and windowlength total are required, which are transferred to this level of hierarchy from the outside.

Firstly, in block 0-6-2, the moving mean of the signal Input arriving at the input is calculated across a window of the length of windowlength_mean samples. For the decision as to whether a correlation magnitude value 120 currently to be assessed is a correlation maximum value, the correlation floor must be considered before and after this point, but at the same time, a predefined area around this point must be left out so as to avoid erroneous decisions in block 0-6-6. The non-used area before and/or after the point considered magnitudes to (windowlength_total−windowlength_mean)−samples, respectively.

In order to meet both conditions, the signal resulting from the averaging is added, in block 0-6-4, with the signal delayed by (2*windowlength_total−windowlength_mean) samples in block 0-6-3. In FIG. 2, this corresponds to an addition of the mean-value block A with the mean-value block B.

Since the addition of both mean-value blocks A, B (shown in FIG. 2) entails doubling the power, the samples of the incoming signal are multiplied by 0.5 in block 0-6-5. The signal obtained at the end of the calculation of the correlation floor is referred to as mean_corr.

For the combination floor value resulting from mean-value blocks A, B to contribute to the decision concerning the correlation magnitude value to be assessed, the correlation signal arriving at the input is delayed by (windowlength_total)−samples in block 0-6-1. The delayed correlation signal is referred to by corr. The two signals corr and mean_corr may now be passed to block 0-6-6 for determining the position of the correlation maxima.

Signals corr and mean_corr, which previously have been calculated at level 0-6, are now applied to block 0-6-6. Here, corr refers to the delayed correlation signal, and mean_corr refers to the respectively associated values of the correlation floor.

In addition, parameters peakmean_thresh and minsamples_bw2peaks, which are passed on to this level from externally, are also required at the level 0-6-6.

For one pair of input samples (corr, mean_corr) each, block 0-6-6 provides an output sample trigger with elements 0 or 1. A one is given to the outside in the sample clock B_clock_4 for each detected maximum, otherwise a zero.

At the start of block 0-6-6, the internal parameter samples_lastpeak is set to the value of zero. The parameter samples_lastpeak is utilized to avoid an erroneous detection of a peak due to multi-path propagation.

Before a decision as to whether there is a maximum may be taken, initially two successive samples of the signal corr need to exist in a buffer_corr, and two associated values of the signal mean_corr need to exist in a buffer_meancorr.

Thus, for the first pair of input samples (corr, mean_corr), the output signal trigger=0 is given to the outside without making a decision. Once the second sample pair has been read in, a decision concerning a minimum may be made for the correlation sample first read in. If it is a maximum, the parameter samples_lastpeak=1 and trigger=1 is set, i.e. a 1 is given to the outside. If there is no maximum, however, a zero is passed on at the trigger signal.

This leads to a delay by 1 in the output signal as compared with the input signal, since it is only in the (n+1)th output sample "position" that one obtains information as to whether a new maximum has been detected in the n-th correlation sample corr.

In the further process, prior to the decision concerning a maximum, the oldest sample in the buffer buffer_corr is replaced by the new input sample corr, and accordingly, the oldest sample in the buffer buffer_meancorr is replaced by the input sample mean_corr. In addition, trigger is set to =0, and the parameter samples_lastpeak, if it is different from zero, is incremented by 1. If, then, samples_lastpeak=minsamples_$bw$2peaks−1 is true for this parameter, samples_lastpeak is reset to equal zero, and this value is not changed up to the next detection of a maximum.

Figure 7:
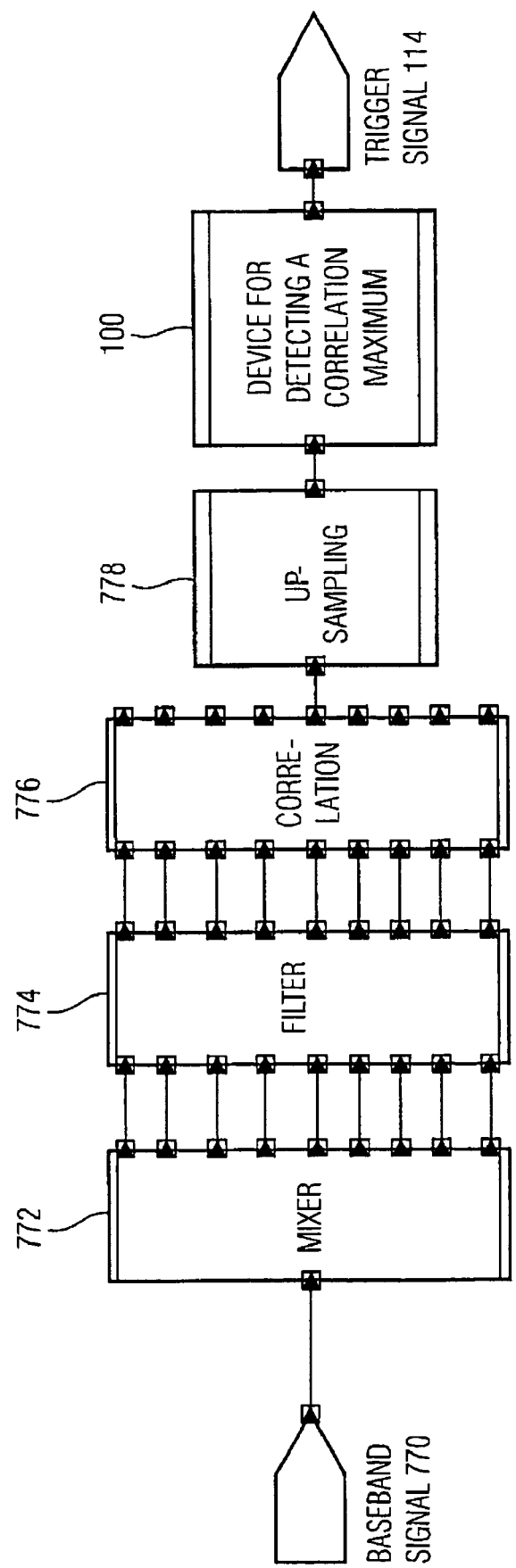
FIG. 7 a block diagram of a receiver with a device for detecting a correlation magnitude maximum in accordance with an embodiment of the present invention.

FIG. 7 shows a block diagram of a receiver with a device 100 for detecting a correlation maximum value in accordance with an embodiment of the present invention. A mixer 772 passes on a receive signal 770, mixed into the (complex) baseband, to a filter 774 in a sample clock B_clock. The filter 774 is connected downstream from mixer 772. A receive signal generated by the matched filter 774 is correlated with a known signal sequence in a subsequent correlation block 776. The correlation block 776 is configured to continuously provide correlation magnitude values, from which the maximum is subsequently determined. The correlation magnitude values may be up-sampled in a following up-sample block 778. In the subsequent device for detecting a correlation maximum value, the position of the correlation maxima is calculated, and a trigger signal is output.

The preceding parameters will be defined in the subsequent FIGS. 8a to 8i.

Parameter windowlength_total defines the number of samples used in the averaging, plus those not considered in the averaging since they lie between the interval and the correlation magnitude value to be assessed.

The Parameter windowlength_mean defines the number of samples used for averaging.

The Parameter peakmean_thresh describes the threshold that must be exceeded by the ratio between the correlation and the mean value of the correlation.

The Parameter minsamples_bw2peaks defines the minimum difference between two detectable peaks.

The Parameter peak2mean defines the ratio of the correlation magnitude value to the correlation floor in the event of a detected peak, rounded to one decimal place.

The Parameter t_noprecorrvals defines a number of correlation magnitude values before the expected correlation peak.

The Parameter t_SNIRcorrfact defines a length correction factor for the estimated SNIR of the T burst.

The Parameter t_SNIRtresh defines a threshold for an estimated SNIR from which a detected peak in a T burst is said to be valid.

toa defines an estimated time of arrival of the t-burst start, the T burst being the signal sequence known to the receiver and used for correlation.

Even though in the preceding embodiments, reference has been made to a digital communication system, the inventive approach may also be used for detecting a threshold value and/or a maximum for any sequence of values desired. If the sequence of values is a sequence of correlation values or correlation magnitude values, these may be ascertained by means of cross-correlations, auto-correlations or other types of correlation. The individual correlation magnitudes may also be made up of individual partial correlation magnitudes. The detection of a correlation magnitude maximum and/or the time of occurrence of the correlation magnitude maximum, and thus the time of arrival of a sequence of values received, may be used, in addition to synchronization, also for all any other purposes wherein a time of arrival of a known sequence used for correlation is to be determined.

Depending on the circumstances, the inventive method for ascertaining a threshold value as well as the inventive method for detecting a correlation maximum value may be implemented in hardware or in software. The implementation may be effected on a digital storage medium, in particular a disc or CD with electronically readable control signals which may be cooperate with a programmable computer system such that the respective method is performed. Generally, the invention thus also consists in a computer program product with a program code, stored on a machine-readable carrier, for performing the inventive method when the computer program product runs on a computer. In other words, the invention may thus be realized as a computer program with a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for ascertaining a threshold value for determining whether a correlation magnitude value, to be assessed, from a sequence of correlation magnitude values is a correlation maximum value, the device comprising:
   a determiner for determining a reference value from correlation magnitude values within an interval of the sequence of correlation magnitude values, the value to be assessed being external to the interval; and
   a determiner for determining the threshold value in dependence on the reference value.

2. The device for ascertaining as claimed in claim 1, wherein the determiner is configured to determine the reference value by means of taking the mean from the correlation magnitude values within the interval.

3. The device for ascertaining as claimed in claim 1, wherein the determiner for determining the threshold value is configured to determine the threshold value by weighting the reference value with a predetermined weighting factor.

4. The device for ascertaining as claimed in claim 1, further having a correlator for determining the correlation magnitude values of the sequence of correlation magnitude values from a correlation between a receive sequence and a transmit sequence.

5. The device for ascertaining as claimed in claim 1, wherein there are a plurality of correlation magnitude values of the sequence of correlation magnitude values between the correlation magnitude value to be assessed and the interval.

6. The device for ascertaining as claimed in claim 5, wherein the number of correlation magnitude values ranging between the value to be assessed and the interval depends on the length of the transmit sequence.

7. The device for ascertaining as claimed in claim 1, further comprising a determiner for determining a further reference value from correlation magnitude values within a further interval of the sequence of correlation magnitude values, the value to be assessed ranging between the interval and the further interval and
   wherein the determiner for determining the threshold value is configured to determine the threshold value in dependence on the reference value and the further reference value.

8. The device for ascertaining as claimed in claim 7, wherein the correlation magnitude values of the sequence of correlation magnitude values are successive in time; and wherein the determiner for determining the reference values comprises a mean-value provider for providing a moving mean value across a number of correlation magnitude values corresponding to the interval size and the further interval size, and a delayer for providing a delayed mean value, configured to delay the mean value depending on the width of the interval and the distance of the interval and the further interval; and an adder for adding the mean value and the delayed mean value, the mean value corresponding to the further reference value, and the delayed mean value to the reference value.

9. The device for ascertaining as claimed in claim 1, wherein the correlation magnitude values of the sequence of correlation magnitude values are cross-correlation magnitude values.

10. The device for ascertaining as claimed in claim 1, wherein the sequence of correlation magnitude values is a continuous sequence of correlation magnitude values.

11. A device for detecting a correlation maximum value from a sequence of correlation magnitude values, comprising:

a device for ascertaining a threshold value for determining whether a correlation magnitude value, to be assessed, from a sequence of correlation magnitude values is a correlation maximum value, the device comprising:

a determiner for determining a reference value from correlation magnitude values within an interval of the sequence of correlation magnitude values, the value to be assessed being external to the interval; and a determiner for determining the threshold value in dependence on the reference value;

and a comparator for comparing the correlation magnitude value to be assessed with the threshold value ascertained for the correlation magnitude value to be assessed, the comparator being configured to provide a trigger signal in dependence on the comparison result, the trigger signal indicating whether a correlation magnitude value to be assessed is a correlation maximum value.

12. The device for detecting as claimed in claim 11, the comparator further comprising a storer for storing a preceding correlation magnitude value to be assessed, and further being configured to provide the trigger signal in dependence on a comparison of the correlation magnitude value to be assessed with the preceding, stored correlation magnitude value.

13. The device for detecting as claimed in claim 11, wherein the comparator comprises a deactivator configured to deactivate the comparator for a predetermined latency period as a result of detecting a correlation maximum value, the latency period depending on a predetermined temporal distance of two periodically successive correlation maximum values.

14. The device for detecting as claimed in claim 11, further comprising a determiner for determining a reversal point of the sequence of correlation magnitude values, configured to provide, in response to a correlation maximum value being detected, temporal information about an occurrence of a reversal point preceding the correlation maximum value.

15. The device for detecting as claimed in claim 14, wherein the temporal information indicates a number of correlation magnitude values ranging between the correlation maximum value and the reversal point.

16. The device for detecting as claimed in claim 14, further comprising an interpolator configured to interpolate the sequence of correlation magnitude values, and the determiner for determining a reversal point being configured to perform the calculation of the reversal point on the basis of the interpolation.

17. The device for detecting as claimed in claim 11, further comprising an ascertainer for ascertaining a difference between the magnitude of the correlation maximum value detected and the reference value.

* * * * *